Patented Jan. 29, 1935

1,989,628

UNITED STATES PATENT OFFICE 1,989,628

PRODUCTION OF DIMETHYLOL UREA

Matthias Schmihing, Ludwigshafen - on - the - Rhine, Germany, assignor, by mesne assignments, to Unyte Corporation, New York, N. Y., a corporation of Delaware No Drawing. Application September 23, 1931, Serial No. 564,727. In Germany October 7, 1930

5 Claims. (Cl. 260—125)

The present invention relates to the production of dimethylol urea.

It has already been proposed to prepare dimethylol urea by the condensation of urea with aqueous formaldehyde at from 10° to 30° C. in the presence of substances having a basic action. By this method, however, the yields are only small. It has therefore already been proposed to condense the components in absence of water, but this method has not hitherto been carried out in practice, or the condensation of urea and formaldehyde has been carried out in aqueous alkaline solutions at from 15° to 35° C. at such a low hydroxyl-ion concentration that a substantial rise of temperature is avoided.

I have now found that dimethylol urea is obtained in an advantageous form, in practically theoretical yields and in a comparatively short time by causing urea and formaldehyde to react in about theoretical proportions in aqueous, neutral or weakly alkaline media, at room temperature, and at the same time, or up to one hour after mixing them together, distilling off, at a low temperature not exceeding 45° C., such an amount of water that the solution contains from about 55 to about 60 per cent by weight of dimethylol urea, the crystal pulp being dried at a low temperature not exceeding 45° C. after allowing to stand for a short time, as for example half a day. The said aqueous, neutral or weakly alkaline media are those which show a hydrogen-ion concentration between pH=7 and pH=9. By the term "room temperature" I wish to define temperatures between 20° and 45° C. The said distillation at low temperature is preferably effected while carrying off water vapour, for example by working in vacuo, such as at from 60 to 20 millimetres of mercury, or while leading through the reaction mass a current of an inert gas such as nitrogen. When working with a commercial 30 per cent aqueous formaldehyde solution, from 20 to 30 per cent of the water is distilled off so that the solution contains from about 55 to about 60 per cent by weight of dimethylol urea.

The reaction is completed in most cases after 1 hour and provides usually almost the whole of the heat necessary to distil off the water. The heating may be allowed to proceed up to about from 40° to 45° C. without injury to the quality of the product. By removing a part of the water the concentration of the solution increases so that the separation of the dimethylol urea is complete at the most after from 10 to 12 hours.

In order to complete the separation of the dimethylol urea, the reaction mixture may be cooled externally down to say 15° C. A stiff crystal pulp is formed which may be removed from the apparatus with scoops. It is unnecessary to remove the mother liquor by centrifuging, the crystal pulp being immediately subjected to drying if desired so that the fraction dissolved in the mother liquor is also recovered. The drying is preferably effected at temperatures between 30° and 45° C., for example by drying in vacuo, temperatures of 45° C. being not substantially exceeded.

The following example will further illustrate the nature of this invention but the invention is not restricted to this example.

Example 200 kilograms of 30 per cent aqueous formaldehyde are rendered slightly alkaline with the aid of 200 cubic centimetres of aqueous 5N caustic soda solution and warmed to 30° C. 60 kilograms of urea are then rapidly introduced while stirring. The negative heat of solution is compensated for by the slight amount of heat supplied, so that the reaction commences immediately. 48 litres of water are then distilled off at about 30 millimetres of mercury and at an initial temperature of 40° C. during about half an hour. Since the heat of reaction is not quite sufficient for this purpose, the remainder of the necessary heat must be supplied. Towards the conclusion the distillation is carried out in such a manner that the temperature of the solution falls to 30° C. and at about 20 millimetres of mercury. The reaction mixture is then allowed to stand for from 10 to 12 hours, cooling to about 15° C. preferably being applied in hot rooms or climates. The dimethylol urea separates during this period as a stiff crystal pulp which is spread out on sheet metal in thin layers and dried at from 35° to 40° C. for about 20 hours in vacuo at about 40 millimetres of mercury. The dried product is ground in a disintegrator mill and the ground product is sieved to the desired size according to the purpose for which it is to be employed. The yield is 115 kilograms of dimethylol urea having a melting point of from 128° to 130° C. The whole process only occupies about 35 hours.

What I claim is:—

1. In the production of dimethylol urea by condensing theoretical proportions of urea and formaldehyde at a temperature between 20° and 45° C. in an aqueous solution having a hydrogen ion concentration ranging from neutral to weakly alkaline, the step which comprises inspissating the resulting solution at a temperature up to 45° C.

until the solution contains from about 55 to about 60 per cent of dimethylol urea, the inspissation being begun within an hour after the mixing of the reactants.

2. In the production of dimethylol urea by condensing theoretical proportions of urea and formaldehyde at a temperature between 20° and 45° C. in an aqueous solution having a hydrogen ion concentration ranging from neutral to weakly alkaline, the steps which comprise inspissating the resulting solution at a temperature up to 45° C. until the solution contains from about 55 to about 60 per cent of dimethylol urea, the inspissation being begun within an hour after the mixing of the reactants, and drying the resulting crystal pulp at a temperature up to 45° C.

3. In the production of dimethylol urea by condensing theoretical proportions of urea and formaldehyde at a temperature between 20° and 45° C. in an aqueous solution having a hydrogen ion concentration ranging from neutral to weakly alkaline, the steps which comprise inspissating the resulting solution at a temperature up to 45° C. until the solution contains from about 55 to about 60 per cent of dimethylol urea, the inspissation being begun within an hour after the mixing of the reactants, and drying the resulting crystal pulp at a temperature up to 45° C. after standing for up to 12 hours.

4. In the production of dimethylol urea by condensing theoretical proportions of urea and formaldehyde at a temperature between 20° and 45° C. in an aqueous solution having a hydrogen ion concentration ranging from neutral to weakly alkaline, the step which comprises inspissating the resulting solution, while carrying off water vapor, at a temperature up to 45° C. until the solution contains from about 55 to about 60 per cent of dimethylol urea, the inspissation being begun within an hour after the mixing of the reactants.

5. The process for the production of dimethylol urea which comprises warming a solution of about 2000 parts by weight of an aqueous about 30 per cent formaldehyde solution containing about 0.4 part of caustic soda to 30° C., rapidly introducing, while stirring, about 600 parts of urea, distilling off about 480 parts of water in the course of about one-half hour at an initial pressure of about 30 millimetres of mercury and at an initial temperature of 45° C. and at a final pressure of about 20 millimetres of mercury and at a final temperature of 30° C., cooling the remainder to about 15° C., separating the crystal pulp of dimethylol urea separating out and drying the crystals at about 40 millimetres of mercury and at from 35° to 40° C.

MATTHIAS SCHMIHING.